UNITED STATES PATENT OFFICE.

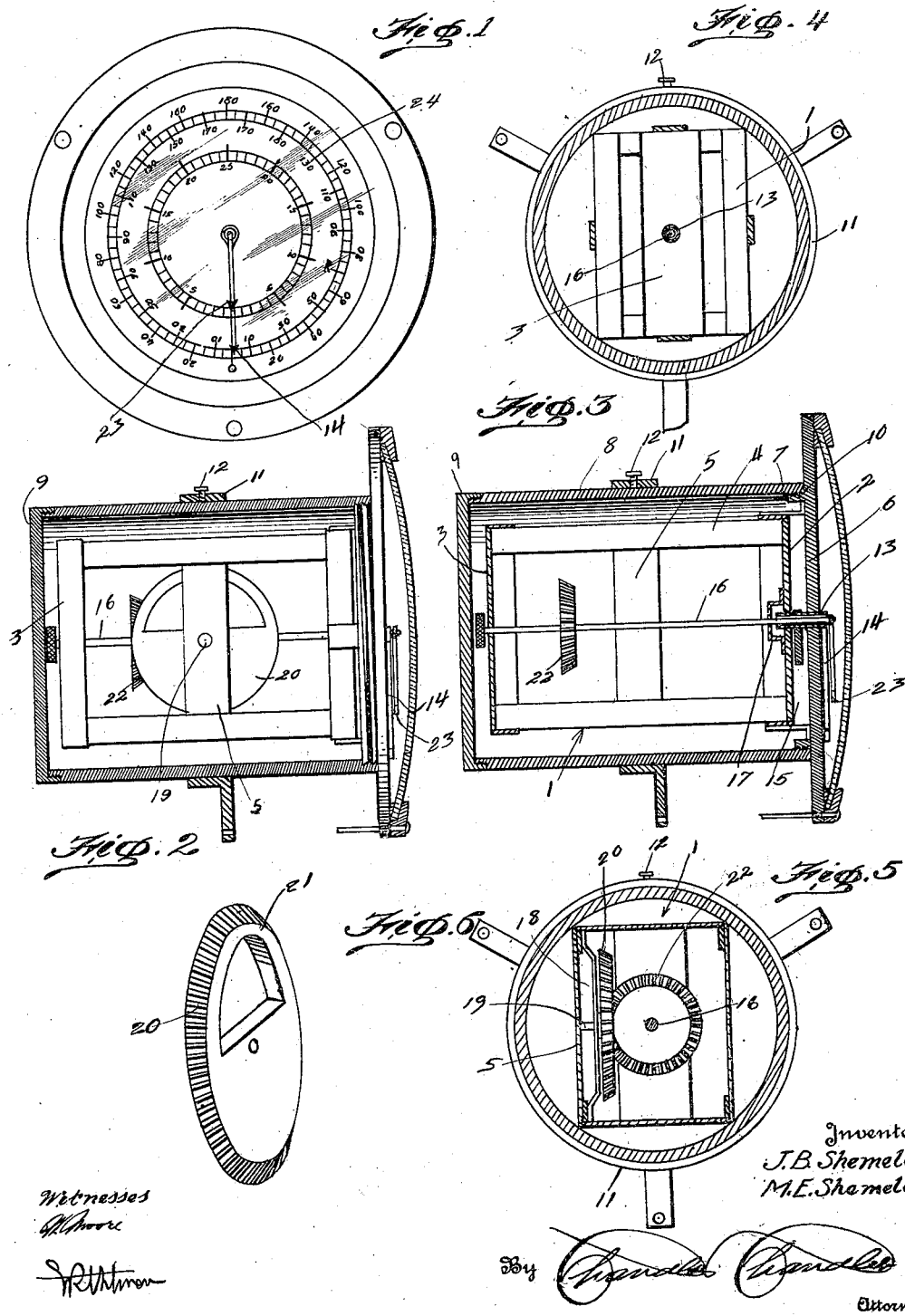

JESSE B. SHEMELEY AND MARION E. SHEMELEY, OF EL PASO, TEXAS.

GRADE-INDICATOR.

1,290,793.

Specification of Letters Patent.

Patented Jan. 7, 1919.

Application filed November 27, 1917. Serial No. 204,231.

*To all whom it may concern:*

Be it known that we, JESSE B. SHEMELEY and MARION E. SHEMELEY, citizens of the United States, residing at El Paso, in the county of El Paso, State of Texas, have invented certain new and useful Improvements in Grade-Indicators; and we do hereby declare the following to be a full, clear, and exact description of the invention, such as will enable others skilled in the art to which it appertains to make and use the same.

This invention relates to grade indicators, and has particular reference to instruments for use on motor vehicles, flying machines, or marine vessels.

The object of the invention is to provide an instrument of simple construction which will indicate the inclination of a vehicle or vessel in both a lateral and a longitudinal direction.

Furthermore, it is the object of the invention to provide an instrument which will indicate the inclination of the vehicle or craft carrying the instrument to one side or the other, and will simultaneously indicate the grade, whether it be up or down with relation to the direction of the vehicle or craft. In this connection, the instrument is preferably arranged to indicate the inclinations in direct terms. That is, the inclinations to one side or the other are indicated in degrees, while the incline of the vehicle on the longitudinal axis is expressed on the dial plate in gradient percentages.

With the above objects in view, and such others relating to the details of construction, as may hereinafter appear, our invention will now be fully set forth and described, reference being had to the accompanying drawings.

In the drawings:—

Figure 1 is a front elevational view of the improved instrument.

Fig. 2 is a side elevational view of the body frame of the instrument, the inclosing casing being in section.

Fig. 3 is a central sectional view taken longitudinally through the instrument on a plane intersecting the axis of the instrument.

Fig. 4 is a transverse sectional view through the instrument on the line 4—4 of Fig. 1.

Fig. 5 is a transverse sectional view through the instrument on the line 5—5 of Fig. 1.

Fig. 6 is a perspective view of the weighted gear wheel for procuring an indication of the grade in one direction.

Referring more particularly to the drawings, 1 represents a frame which has the front head 2 and the rear head 3, the heads being connected by angular corner bars 4. Furthermore, the angle bars are of such length as to elongate the frame somewhat, and substantially at their middle points the bars are connected by transverse struts 5. Mounted upon the front of the frame 1 is a dial plate 6 which is secured in position by means of a plurality of angle brackets 7 which are fastened to the back of the dial and also to the outer sides of the frame 1. A cylindrical jacket 8 having a cap 9 threaded upon its rear end, may also be removably fixed to the back of the dial plate, as by being threaded on a flange 10 extending from the back of the dial plate 6. A slip collar support 11 movable over the outer surface of the cylindrical casing 10 may be fixed to the casing by means of a set-screw 12, so that the instrument may be adjusted with relation to the vehicle upon which it is mounted.

Having a bearing at the head 2, and another bearing in the dial plate 6 is a tubular shaft 13. said tubular shaft 13 extending beyond the front face of the dial 6 so as to receive thereon an indicating hand 14. Between the head 2 and the inner face of the dial plate, the shaft 13 has mounted thereon the counter weight 15 which is so constructed and balanced that it will respond to variations in the inclination of the instrument or the vehicle upon which it is carried, in lateral directions.

Extending longitudinally through the frame is a shaft 16 whose rear end has a bearing in the head 3, and whose forward end is journaled in a bearing bracket 17 which is carried upon the rear side of the head 2, the shaft 16 then extending through the tubular shaft 13 and beyond the front face of the dial plate. Thus, while the shafts 13 and 16 rotate upon a common axis, their actions may be independent of one another. Mounted between one of the transverse struts of the frame 1 and a parallel brace 18 is a shaft 19 upon which is carried a balance wheel 20. The balance wheel 20 is a combination counterweight and bevel gear wheel, and is formed of an annulus 21 having a series of bevel teeth cut therein, and having its lower half formed as a shoulder casting which will cause the balance wheel to gravitally seek a normal position by swinging on its axis in accordance with the change in inclination of the instrument transversely of its axis. Meshing with the teeth of the balance wheel 20 is a smaller bevel gear 22 which is fixed upon the shaft 16, so that the movements of the balance wheel will be communicated to the shaft 16 and through the latter to an indicating hand 23 secured upon the forward end of the shaft to overlie the dial plate 6. The hand 23 is frictionally mounted upon the shaft 16, so that by relative movement of the hand upon the shaft the instrument may be adjusted for zero position, a knurled head upon the rear end of the shaft 16 permitting the latter to be fixedly held while the hand is adjusted thereon.

The dial plate 6 is provided with two sets of graduations which are concentrically arranged, and are to be read in connection with the hands 14 and 23. The outer set of graduations 24 is divided into degrees, which read from the bottom of the dial in both directions toward the top in sets of 180 degrees each, and the hand 14 swinging thereover indicates in degrees the lateral inclination of the vehicle. The inner set of graduations are divisions indicating percentage, and in the present case read from zero at the bottom to twenty-five at the top, and as the hand 23 swings thereover, represents the percentage of the gradient over which vehicles travel, and also the direction of the gradient, whether it be up or down. Preferably, one half of the dial plate, within the inner set of graduations is colored so as to distinguish from the opposite half, thereby providing a greater aid to the vision in reading the instrument.

The instrument which has been described, therefore, provides a direction indicating apparatus for determining the lateral inclination of the vehicle or craft upon which it mounted, and will simultaneously indica the upward or downward progress of the craft or vehicle or the gradient of the road over which it is moving. The construction of the instrument is very simple, and its manufacture, by reason of the small number of parts and their comparative simplicity, may be carried out at a minimum cost.

What we claim as our invention is:—

1. A grade indicator including a frame adapted for securement to a vehicle, a tubular shaft journaled in the frame, a second shaft rotatably mounted in the tubular shaft, indicating hands carried on adjacent ends of the shafts, a dial plate coöperating with said indicator hands, a balance weight suspended from the tubular shaft, a shaft journaled in the frame and extending transversely of the second named shaft and in gear connection therewith and a balance weight carried by the transverse shaft.

2. A grade indicator including a frame adapted for securement to a vehicle, a tubular shaft journaled in the frame, a second shaft rotatably mounted in the tubular shaft, indicating hands carried on adjacent ends of the shafts, a dial plate coöperating with said indicator hands, a balance weight suspended from the tubular shaft, a shaft journaled in the frame and extending transversely of the second named shaft, a disk mounted on the transverse shaft and having one side portion cut away inwardly of its peripheral edge whereby its other side portion forms a balance weight on the shaft, a peripheral series of gear teeth formed on the disk and a gear wheel on the second named shaft meshing with the teeth of the disk.

In testimony whereof, we affix our signatures in the presence of two witnesses.

JESSE B. SHEMELEY.
MARION E. SHEMELEY.

Witnesses:
CHAS. L. GLOVER,
W. M. PARKER.